(12) United States Patent
Stamoulis et al.

(10) Patent No.: US 9,049,695 B2
(45) Date of Patent: Jun. 2, 2015

(54) ASSOCIATION RULES BASED ON CHANNEL QUALITY FOR PEER-TO-PEER AND WAN COMMUNICATION

(75) Inventors: Anastasios Stamoulis, San Diego, CA (US); Stefan Geirhofer, San Diego, CA (US); Jaber Mohammad Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 569 days.

(21) Appl. No.: 13/296,691

(22) Filed: Nov. 15, 2011

(65) Prior Publication Data

US 2012/0129562 A1   May 24, 2012

Related U.S. Application Data

(60) Provisional application No. 61/415,117, filed on Nov. 18, 2010.

(51) Int. Cl.
*H04M 1/00*        (2006.01)
*H04W 76/02*      (2009.01)

(52) U.S. Cl.
CPC .................................. *H04W 76/023* (2013.01)

(58) Field of Classification Search
USPC .............. 455/445, 11.1, 13.1, 41.2, 500, 507, 455/509, 512, 513, 516–519, 67.11, 67.13, 455/67.16, 68, 69, 552.1, 553.1, 436–440, 455/442–444
See application file for complete search history.

(56) References Cited

U.S. PATENT DOCUMENTS

| | | | |
|---|---|---|---|
| 6,957,069 B2 * | 10/2005 | Shah et al. ..................... | 455/436 |
| 7,043,252 B2 * | 5/2006 | Khitrik et al. .............. | 455/452.2 |
| 7,239,874 B2 * | 7/2007 | Reddy et al. .................. | 455/436 |
| 7,519,371 B2 | 4/2009 | Nanda et al. | |
| 7,577,125 B2 * | 8/2009 | Abhishek et al. ............. | 370/338 |
| 7,831,252 B2 * | 11/2010 | Shang et al. .................. | 455/436 |
| 7,953,010 B2 * | 5/2011 | Rodrig .......................... | 370/235 |
| 7,969,954 B2 * | 6/2011 | Abhishek et al. ............. | 370/338 |

(Continued)

FOREIGN PATENT DOCUMENTS

| | | |
|---|---|---|
| EP | 2076092 | 7/2009 |
| JP | H0723464 A | 1/1995 |

(Continued)

OTHER PUBLICATIONS

Written Opinion—PCT/US2011/061055—ISA/EPO—Mar. 7, 2012.

(Continued)

*Primary Examiner* — Tuan A Tran
(74) *Attorney, Agent, or Firm* — Novak Druce Connolly Bove + Quigg LLP

(57) ABSTRACT

Techniques are provided for association decisions by a user equipment (UE) or the like. In one example, there is provided a method that may involve discovering a peer UE, and determining a first metric for the peer UE. The method may further involve determining a second metric for a base station in a wireless area network (WAN). The method may further involve deciding whether to associate with the peer UE for peer-to-peer (P2P) communication or with the WAN for communication via the base station based on the first and second metrics. For example, the first metric may be determined based on received power of the peer UE at the first UE, and the second metric may be determined based on received power of the base station at the first UE.

20 Claims, 8 Drawing Sheets

(56) References Cited

U.S. PATENT DOCUMENTS

| | | | |
|---|---|---|---|
| 8,144,597 B2 * | 3/2012 | Senarath et al. | 370/238 |
| 8,149,800 B2 * | 4/2012 | Sawada | 370/338 |
| 8,265,052 B2 * | 9/2012 | Abhishek et al. | 370/338 |
| 8,493,887 B2 * | 7/2013 | Palanki et al. | 370/254 |
| 2005/0025182 A1 | 2/2005 | Nazari | |
| 2006/0270415 A1 | 11/2006 | Waxman | |
| 2008/0069047 A1 | 3/2008 | Yee et al. | |
| 2009/0011778 A1 | 1/2009 | Jung et al. | |
| 2009/0168689 A1 * | 7/2009 | Itagaki et al. | 370/315 |
| 2010/0093364 A1 | 4/2010 | Ribeiro et al. | |
| 2010/0150120 A1 | 6/2010 | Schlicht et al. | |
| 2010/0169498 A1 * | 7/2010 | Palanki et al. | 709/228 |
| 2010/0189046 A1 | 7/2010 | Baker et al. | |
| 2011/0085530 A1 | 4/2011 | Hellhake et al. | |
| 2011/0244899 A1 | 10/2011 | Li et al. | |

FOREIGN PATENT DOCUMENTS

| | | |
|---|---|---|
| JP | H1023515 A | 1/1998 |
| JP | 2002325281 A | 11/2002 |
| JP | 2005223722 A | 8/2005 |
| JP | 2006310973 A | 11/2006 |
| JP | 2009017559 A | 1/2009 |
| WO | 2005079027 A1 | 8/2005 |

OTHER PUBLICATIONS

International Search Report dated Mar. 7, 2012.

* cited by examiner

ASSOCIATION RULES BASED ON CHANNEL QUALITY FOR PEER-TO-PEER AND WAN COMMUNICATION

CLAIM OF PRIORITY UNDER 35 U.S.C. §119

The present Application for Patent claims priority to Provisional Application No. 61/415,117, filed Nov. 18, 2010, entitled "ASSOCIATION RULES BASED ON CHANNEL QUALITY FOR PEER-TO-PEER AND WAN COMMUNICATION", which is assigned to the assignee hereof and hereby expressly incorporated in entirety by reference herein.

BACKGROUND

I. Field

The present disclosure relates generally to communication, and more specifically to techniques for supporting peer-to-peer (P2P) communication and wireless area network (WAN) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate peer-to-peer with one or more other UEs. It may be desirable to efficiently support P2P communication among UEs and WAN communication between UEs and base stations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects of the embodiments described herein, there is provided an association decision method operable by a mobile entity, such as, for example, a user equipment (UE) or the like. The method may involve discovering a peer UE, and determining a first metric for the peer UE. The method may also involve determining a second metric for a base station in a wireless area network (WAN). The method further involve deciding whether to associate with the peer UE for peer-to-peer (P2P) communication or with the WAN for communication via the base station based on the first and second metrics. In related aspects, an electronic device (e.g., a UE or component(s) thereof) may be configured to execute the above-described methodology.

In related aspects, the step of determining the first metric for the peer UE may involve: receiving a P2P signal from the peer UE; making measurements of received power of the received P2P signal; and determining the first metric based on the measurements. In further related aspects, the step of determining the first metric may involve determining the first metric based on received power of the peer UE at the first UE. The step of determining the second metric may involve determining the second metric based on received power of the base station at the first UE.

In yet further related aspects, the step of determining the first metric may involve determining the first metric based on pathloss between the peer UE and the first UE. The step of determining the second metric may involve determining the second metric based on pathloss between the base station and the first UE. In still further related aspects, the step of determining the first metric may involve determining the first metric based on a long-term channel gain for the peer UE. The step of determining the second metric may involve determining the second metric based on a long-term channel gain for the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1 is a block diagram conceptually illustrating an example of a telecommunications system.

FIG. 2 is a call flow diagram for an example technique for making association decisions for P2P communication or WAN communication.

FIG. 3 is a block diagram of an embodiment of an apparatus for supporting associations decisions.

FIG. 4A illustrates an example association decision methodology executable by a UE or the like.

FIGS. 4B-C illustrate further aspects of the methodology of FIG. 4A.

FIG. 5 illustrates details an embodiment of a radio network including a UE and an eNB which may be configured for association decisions (e.g., for P2P communication or WAN communication).

FIG. 6 shows an embodiment of an apparatus for association decisions, in accordance with the methodology of FIGS. 4A-C.

DETAILED DESCRIPTION

Techniques for supporting P2P communication and WAN communication are described herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
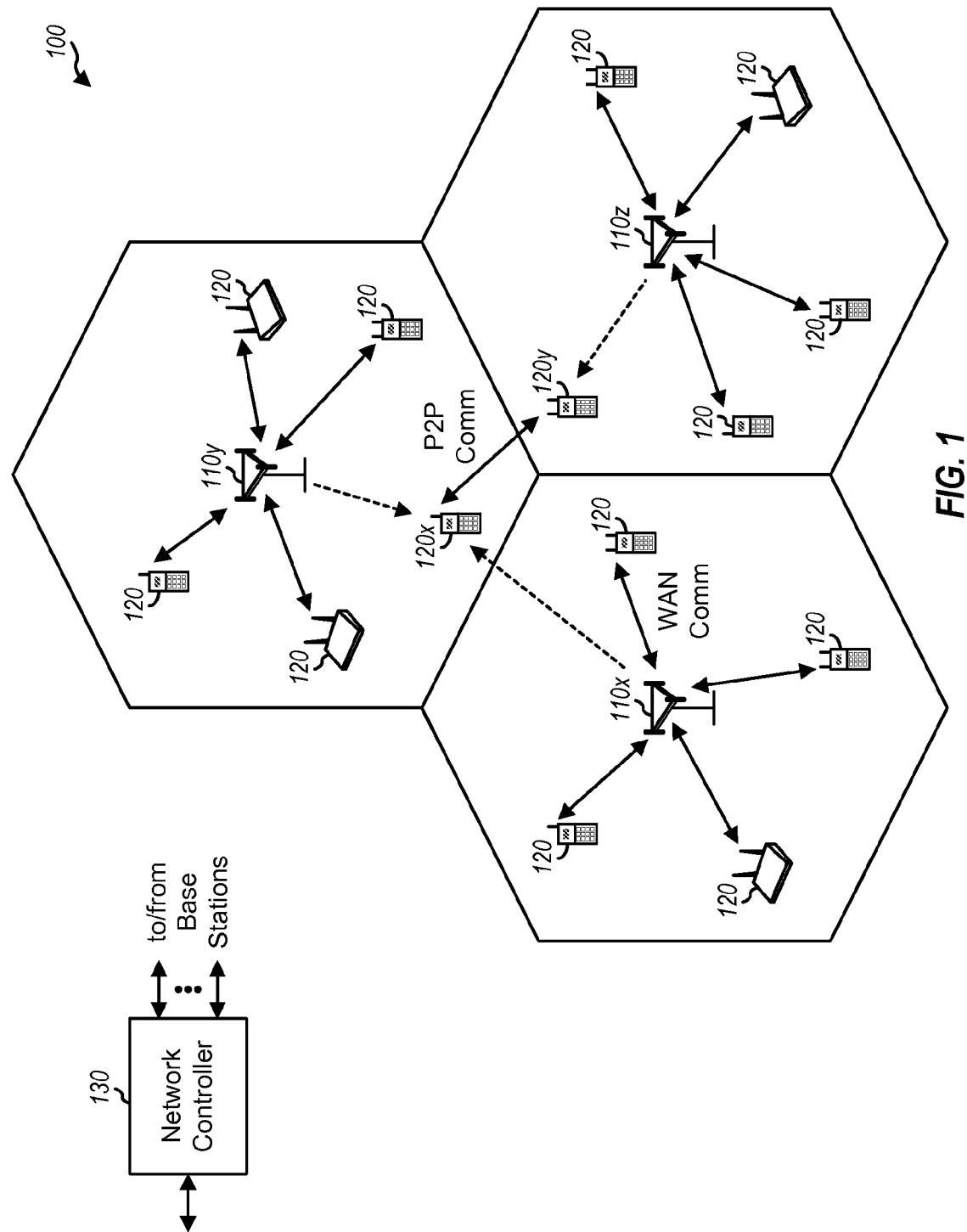

FIG. 1 shows a wireless communication network 100, which may be a wide area network (WAN) such as an LTE network or some other type of WAN. Wireless network 100 may include a number of base stations and other network entities. For simplicity, only three base stations 110x, 110y and 110z and one network controller 130 are shown in FIG. 1. A base station may be an entity that communicates with the UEs and may also be referred to as a node, a Node B, an evolved Node B (eNB), an access point, etc. Each base station may provide communication coverage for a particular geographic area and may support communication for the UEs located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro base stations 110a, 110b and 110c for macro cells. Wireless network 100 may also include pico base stations for pico cells and/or femto/home base stations for femto cells (not shown in FIG. 1).

Wireless network 100 may also include relay stations. A relay station may be an entity that receives a transmission of data from an upstream station (e.g., a base station or a UE) and sends a transmission of the data to a downstream station (e.g., a UE or a base station). A relay station may also be a UE that relays transmissions for other UEs. A relay station may also be referred to as a node, a relay, a relay base station, etc.

Wireless network 100 may be a homogeneous network that includes base stations of the same type, e.g., macro base stations. Wireless network 100 may also be a heterogeneous network that includes base stations of different types, e.g., macro base stations, pico base stations, femto base stations, relay stations, etc. These different types of base stations may have different transmit power levels, different coverage areas, and different impact on interference in wireless network 100. For example, macro base stations may have a high transmit power level (e.g., 20 Watts or +43 dBm), pico base stations and relay stations may have a lower transmit power level (e.g., 2 Watts or +33 dBm), and home base stations and UEs may have a low transmit power level (e.g., 0.2 Watts or +23 dBm). Different types of base stations may belong in different power classes having different maximum transmit power levels.

Network controller 130 may couple to a set of base stations and may provide coordination and control for these base stations. Network controller 130 may communicate with the base stations via a backhaul. The base stations may also communicate with one another via the backhaul.

UEs 120 may be dispersed throughout wireless network 100, and each UE may be stationary or mobile. A UE may also be referred to as a node, a station, a mobile station, a terminal, an access terminal, a subscriber unit, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with base stations, relay stations, other UEs, etc.

In the description herein, P2P communication refers to direct communication between two or more UEs, without going through a network entity such as a base station or a relay station. WAN communication refers to communication between a UE and a remote station (e.g., another UE) via at least one network entity such as a base station or a relay station. A node may be a base station, a relay station, a UE, etc.

Conventional WANs do not support direct communication between UEs. Hence, any UE-to-UE traffic is first transmitted by a source UE to its serving base station and subsequently by the same base station or a different base station to a destination UE. This WAN-centric approach is natural and proven to be effective in many cases, especially if the UEs are located far apart from each other.

However, direct communication between UEs may offer efficiency and other benefits if the UEs are close-by. In particular, efficiency may improve for direct communication because the pathloss between two UEs may be substantially smaller than the pathloss between each UE and its closest base station. Furthermore, efficiency may improve because only a single transmission "hop" is needed for direct communication between two UEs whereas two transmission hops are needed for WAN communication—one transmission hop on the uplink from the source UE to its serving base station and another transmission hop on the downlink from the same or different base station to the destination UE.

A UE may support P2P communication and may detect for peer UEs, e.g., when the UE operates in a P2P mode or is directed by an end user. If the UE discovers a peer UE, then the UE may attempt to communicate with the peer UE. However, the channel quality between the two UEs may be poor, and communication between the UEs may have poor quality and may also adversely impact the operation of other UEs in the wireless network.

In an aspect, a UE may make an association decision to engage in either P2P communication or WAN communication. The association decision may have a large impact on network performance and may be made based on association rules defined to limit complexity at the UE while providing good network performance. In one design, the association rules may be defined based on one or more simple criteria, which may be related to channel quality, as described below.

Figure 2:
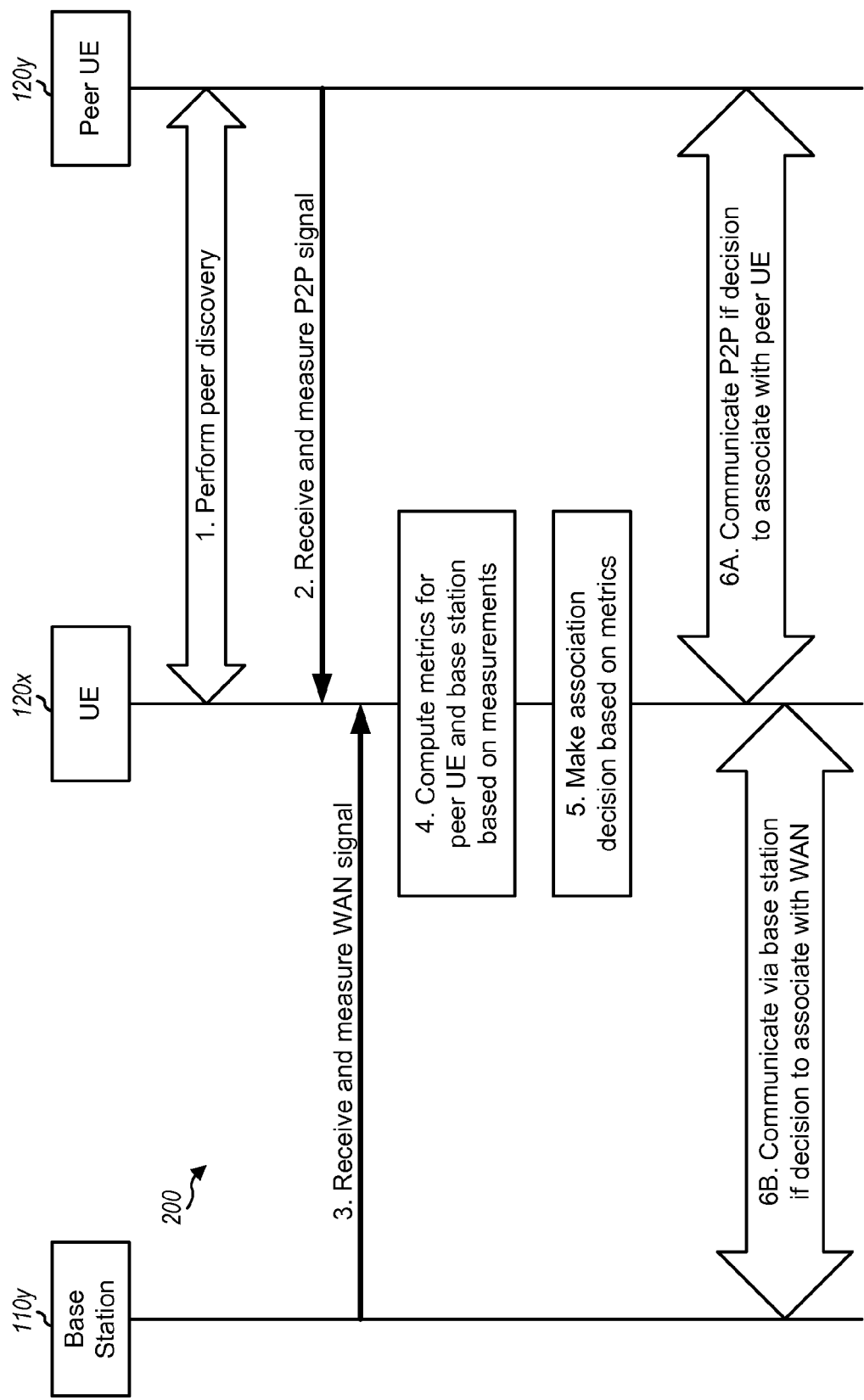

FIG. 2 shows a flow diagram of a design of a process 200 for making an association decision for P2P communication or WAN communication. A UE 120x may perform peer discovery to detect for other UEs (step 1). The peer discovery process may include (i) transmitting a peer detection signal by UE 120x to allow other UEs to detect the presence of UE 120x and/or (ii) detecting for peer detection signals transmitted by other UEs to announce their presence and/or services. UE 120x may detect a peer UE 120y from the peer discovery process.

UE 120x may receive and measure a P2P signal from peer UE 120y (step 2). The P2P signal may comprise the peer detection signal, a reference/pilot signal, and/or some other signal from peer UE 120y. The measurement may be for received power, received signal quality, etc. Received power may also be referred to as received signal strength, pilot strength, etc. Received signal quality may be quantified by a carrier-to-interference ratio (C/I), a signal-to-noise ratio (SNR), a signal-to-noise-and-interference ratio (SINR), a carrier-over-thermal (CoT), etc. For clarity, much of the description below refers to C/I for received signal quality. Received power and received signal quality may be two exemplary measures of channel quality.

UE 120x may also search for base stations within its vicinity and may detect base station 110y. UE 120x may receive and measure a WAN signal from base station 110y (step 3). In general, steps 1, 2 and 3 in FIG. 2 may be performed in any order. Steps 1 and 2 may be performed separately, as shown in FIG. 2. Step 2 may also be part of step 1, and UE 120x may make measurements for peer UE 120y during the peer discovery process.

UE 120x may compute metrics for peer UE 120y and base station 110y based on the measurements for the peer UE and the base station (step 4). The metrics may relate to channel quality and may be computed as described below. UE 120x may make a decision to associate with peer UE 120y for P2P communication or with the WAN for communication via base station 110y (step 5). The association decision may be based on association rules, which may be defined based on the metrics for peer UE 120y and base station 110y.

UE 120x may communicate directly with peer UE 120y if a decision is made to associate with the peer UE (step 6A). Alternatively, UE 120x may communicate via base station 110y if a decision is made to associate with the WAN (step 6B).

In general, association rules may be defined based on any number of criteria and any criterion. However, it may be desirable to use simple criteria based on measurements that can be made readily by UE 120x in order to reduce complexity. Some exemplary association rules based on simple criteria are described below.

In one design, association rules may be defined based on received power. In this design, a metric for each node may correspond to the received power of that node at a UE making an association decision. In the example shown in FIG. 2, UE 120x may measure the received power of peer UE 120y and may also measure the received power of base station 110y. UE 120x may then make an association decision based on maximum received power. In particular, UE 120x may associate with peer UE 120y and communicate peer-to-peer if the received power of peer UE 120y is higher than the received power of base station 110y. Conversely, UE 120x may associate with the WAN and communicate via base station 110y if the received power of base station 110y is higher than the received power of peer UE 120y. Since macro base stations typically have a much higher transmit power level than UEs (e.g., +43 dBm for macro base stations versus +23 dBm for UEs), association decisions based on received power may be biased more toward WAN communication.

In another design, association rules may be defined based on pathloss. In this design, a metric for each node may correspond to the pathloss between that node and a UE making an association decision. In the example shown in FIG. 2, UE 120x may measure the received power of peer UE 120y and may determine the pathloss between UE 120x and UE 120y based on the difference between the transmit power (in dBm) of UE 120y and the received power (in dBm) of UE 120y. UE 120x may also measure the received power of base station 110y and may determine the pathloss between base station 110y and UE 120x based on the difference between the transmit power (in dBm) of base station 110y and the received power (in dBm) of base station 120y. UE 120x may then make an association decision based on minimum pathloss. In particular, UE 120x may associate with peer UE 120y and communicate peer-to-peer if the pathloss between UE 120x and UE 120y is less than the pathloss between base station 110y and UE 120x. Conversely, UE 120x may associate with the WAN and communicate via base station 110y if the pathloss for base station 110y is less than the pathloss for peer UE 120y. Since pathloss takes into account the transmit power level of each node, association decisions based on pathloss may be biased more toward P2P communication.

If the pathloss between UE 120x and UE 120y is small, then P2P communication would likely be beneficial since relatively low transmit power may be sufficient to overcome noise and interference at the receiver of each UE. In such a scenario, P2P communication between UE 120x and UE 120y may generate a small amount of interference to other UEs operating on the same frequency. To reduce interference, the transmit power of each UE may be controlled to not exceed the transmit power level needed to achieve good performance via the P2P link between the two UEs.

In one design, an offset may be used to bias association decisions more toward either the WAN or peer UE. The offset may be (i) a fixed value that is used all the time or (ii) a configurable value that can change over time. The offset may be applicable for all UEs and may be broadcast to the UEs or specified in a standard. The offset may also be configurable for each UE (e.g., via higher layers) and may be signaled to the UE. The offset may be applied to the metrics for peer UEs or the metrics for base stations and may marginally increase the complexity of association.

Table 1 lists exemplary values of various parameters of base station 110y and UE 120y that are pertinent for association. In the example shown in Table 1, base station 110y has a transmit power level of +43 dBm and an antenna gain of 13 dB. The pathloss between base station 110y and UE 120x is 100 dB, and the received power of base station 110y at UE 120x is −44 dBm. Peer UE 120y has a transmit power level of +23 dBm and an antenna gain of 0 dB. The pathloss between UE 120x and UE 120y is 70 dB, and the received power of peer UE 120y at UE 120x is −47 dBm.

TABLE 1

|  | Base station 110y | Peer UE 120y |
| --- | --- | --- |
| Transmit power level | +43 dBm | +23 dBm |
| Antenna gain | 13 dB | 0 dB |
| Pathloss to UE 120x | 100 dB | 70 dB |
| Received power at UE 120x | −44 dBm | −47 dBm |
| Offset based on received power | 0 dB | 5 dB |
| Adjusted received power with offset | −44 dBm | −42 dBm |

In the example shown in Table 1, if association rules are defined based on received power, then UE 120x would associate with the WAN and communicate via base station 110y since the −44 dBm received power of base station 110y is higher than the −47 dBm received power of peer UE 120y at UE 120x. However, if association rules are defined based on pathloss, then UE 120x would associate with peer UE 120y and communicate peer-to-peer since the 70 dB pathloss for peer UE 120y is less than the 100 dB pathloss for base station 110y. As illustrated by the example in Table 1, different metrics may favor association with different nodes and may result in different association by UE 120x. In particular, the example in Table 1 shows that received power favors allocation with the WAN whereas pathloss favors association with the peer UE.

In the example shown in Table 1, an offset of 5 dB may be applied to the received power of peer UE 120y, and no offset may be applied to the received power of base station 110y. An adjusted received power of peer UE 120y would then be −42 dBm, and an adjusted received power of base station 110y would be −44 dBm. If association rules are defined based on received power with offset, then UE 120x would associate with peer UE 120y and communicate peer-to-peer since the −42 dBm adjusted received power of UE 120y is higher than the −44 dBm adjusted received power of base station 110y at UE 120x. As illustrated by the example in Table 1, the offset applied to the received power of peer UE 120y can change the bias toward favoring association with the peer UE. In particular, the example in Table 1 shows that UE 120x may associate with the WAN using association rules based on received power without offset but may associate with the peer UE using association rules based on received power with offset.

Table 1 shows an example in which an offset of 5 dB is applied to the received power of peer UE 120y. An offset of 33 dB can compensate for the different transmit power levels and different antenna gains of base station 110y and peer UE 120y. Hence, an offset of 33 dB applied to the received power of peer UE 120y would result in association based on maximum received power with offset being equivalent to association based on minimum pathloss without offset. In general, an offset may be applied to received power, pathloss, or some other metric. An offset may also be applied to the metrics of base stations or peer UEs.

In yet another design, association rules may be defined based on long-term channel gain/strength. The channel gain of a node may be related to the pathloss of the node (e.g., a pathloss of 100 dB may correspond to a channel gain of −100 dB). In this design, a metric for each node may correspond to the long-term channel gain for that node at a UE making an association decision. In the example shown in FIG. 2, UE 120x may measure and average the received power of peer UE 120y and may determine the long-term channel gain $G_{UE}$ for UE 120y. UE 120x may also measure and average the received power of base station 110y and may determine the long-term channel gain $G_{BS}$ for base station 110y. UE 120x may determine a channel difference, which may be the difference between the long-term channel gain (in dB) for base station 110y and the long-term channel gain (in dB) for UE 120y, or ChanDiff=$G_{BS}$−$G_{UE}$. UE 120x may then make an association decision based on the channel difference. In particular, UE 120x may associate with peer UE 120y and communicate peer-to-peer if the channel difference is larger (or smaller) than a threshold. Conversely, UE 120x may associate with the WAN and communicate via base station 110y if the channel difference is smaller (or larger) than the threshold. The use of "larger" or "smaller" inequality is dependent on whether the bias is towards associating with the WAN or the peer UE.

In yet another design, association rules may be defined based on short-term or long-term C/I. In this design, a metric for each node may correspond to the C/I of that node at a UE making an association decision. In the example shown in FIG. 2, UE 120x may measure (and possibly average) the C/I of peer UE 120y. UE 120x may also measure (and possibly average) the C/I of base station 110y. UE 120x may measure the C/I of each node based on a reference signal/pilot, or a control channel, or a data channel, or a combination thereof from the node. UE 120x may then make an association decision based on maximum C/I. In particular, UE 120x may associate with peer UE 120y and communicate peer-to-peer if the C/I of UE 120y is better than the C/I of base station 110y. Conversely, UE 120x may associate with the WAN and communicate via base station 110y if the C/I of UE 120y is worse than the C/I of base station 110y.

Association rules may also be defined based on other criteria such as throughput, leakage, etc. Throughput may be determined by estimating the C/I of a node, converting the estimated C/I to spectral efficiency based on a capacity function, and multiplying the spectral efficiency by the operating bandwidth. The leakage of a base station may comprise interference due to the base station at UEs not served by the base station. A metric for a base station may comprise a signal-to-leakage ratio (SLR), a geometry-to-leakage ratio (GLR), or a throughput-to-leakage ratio (TLR).

In some designs, association rules may be defined based on a single criterion such as received power, or pathloss, or long-term channel gain, or C/I, or some other criterion, as described above. In other designs, association rules may be defined based on a combination of criteria.

In one design, association rules may be defined based on a combination of pathloss and channel difference. UE 120x may associate with peer UE 120y and communicate peer-to-peer if (i) the pathloss for UE 120y is smaller than the pathloss for base station 110y and (ii) the channel difference is larger (or smaller) than a threshold. The channel difference criterion may ensure that UEs with good coverage from base stations have a larger bias towards associating with the WAN instead of the peer UEs.

In another design, association rules may be defined based on a combination of received power and channel difference. In general, association rules may be defined based on any combination of criteria, which may include received power, or pathloss, or channel difference, or C/I, or a combination thereof Whether P2P communication provides performance benefits over WAN communication may depend on (i) the channel quality of the direct/P2P link between UEs and (ii) the channel quality of the WAN links between the UEs and their serving base stations. Association rules based on the channel quality of the P2P link and WAN links may provide performance benefits.

In one design, association may be performed jointly for both the downlink and uplink. For example, UE 120x may make a decision to associate with either the WAN or peer UE 120y for communication on both the downlink and uplink. In another design, association may be performed separately for the downlink and uplink. For example, UE 120x may make a decision to associate with the WAN for communication on the downlink and to associate with peer UE 120y for communication on the uplink.

In the designs described above, association may be performed by a UE to determine whether to associate with the WAN or a peer UE. In other designs, association may be performed by a network entity such as a base station or a relay station. The network entity may receive pertinent information from a UE for which association is performed and may make an association decision for the UE based on any of the association rules described above. The network entity may explicitly or implicitly signal the association decision to the UE.

Interference coordination between the WAN and P2P UEs may be performed to ensure good performance. Interference coordination may include two components. First, if P2P transmissions are sent on the same frequency used by the WAN, then the P2P transmissions will cause interference to WAN transmissions, and vice versa. The severity of this interference may depend on channel conditions and may require resource coordination to assign orthogonal resources to interfering WAN and P2P nodes. Interference coordination between the WAN and P2P nodes may be avoided by having the P2P nodes operate on a dedicated frequency or on semi-statically allocated/configured resources on which the WAN is not active. Second, interference coordination among P2P nodes may be performed since P2P transmissions may strongly interfere with each other. This may be achieved by performing resource coordination to assign orthogonal resources to interfering groups of P2P nodes. Interference coordination among the P2P nodes may be needed regardless of whether P2P transmissions are sent on the same frequency used by the WAN or on a dedicated frequency.

Association and resource allocation for interference coordination may be performed separately (possibly by different entities). Association and resource allocation may also be performed jointly since association decisions typically impact resource allocation, and vice versa. Association and resource allocation may be performed jointly by computing suitable metrics for different possible scenarios of association and resource allocation and then selecting the scenario with the best metric.

Figure 3:
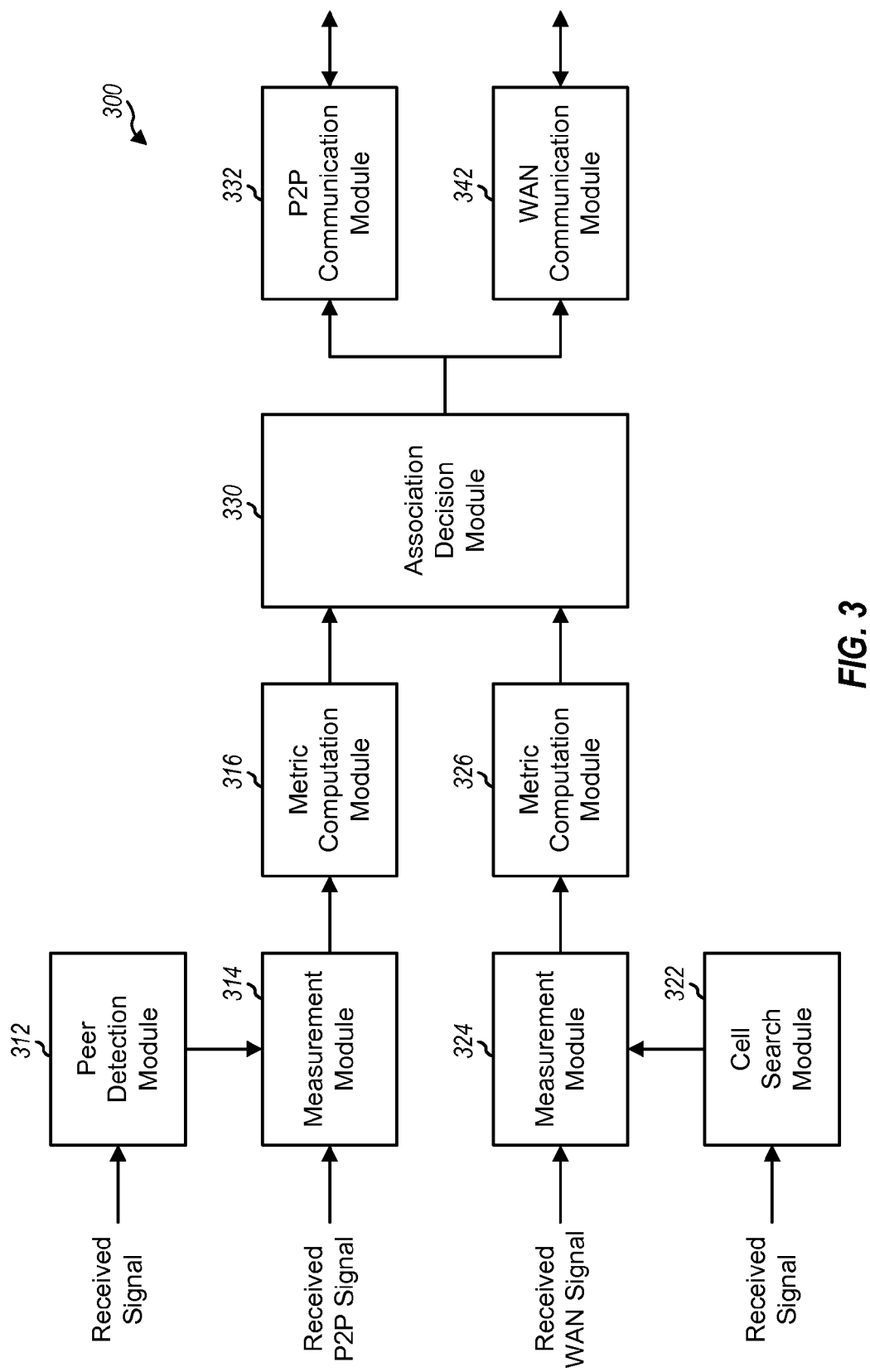

FIG. 3 shows a block diagram of a design of an apparatus 300 supporting association. Apparatus 300 may be part of a UE or some other entity. Within apparatus 300, a peer detection module 312 may process a received signal to detect for the presence of peer UEs and may provide information (e.g., a UE identity (ID)) for each detected peer UE. A measurement module 314 may make measurements (e.g., for received power, C/I, etc.) for each detected peer UE based on a P2P signal received from that peer UE. A metric computation module 316 may compute one or more metrics (e.g., for received power, pathloss, short-term or long-term C/I, long-term channel gain, etc.) for each detected peer UE based on the measurements for that peer UE.

Similarly, a cell search module 322 may process the received signal to detect for the presence of base stations and may provide information (e.g., a cell ID) for each detected base station. A measurement module 324 may make measurements for each detected base station based on a WAN signal received from that base station. A metric computation module 326 may compute one or more metrics for each detected base station based on the measurements for that base station.

An association decision module 330 may receive the metrics for the detected peer UEs from module 316 and the metrics for the detected base stations from module 326. Module 330 may make a decision to associate with the WAN or a peer UE based on the metrics for the peer UEs and base stations. Module 330 may provide the association decision to communication modules 332 and 342. Module 332 may communicate peer-to-peer with a peer UE if association with the peer UE is selected. Module 342 may communicate via a base station if association with the WAN is selected.

Figure 4A:
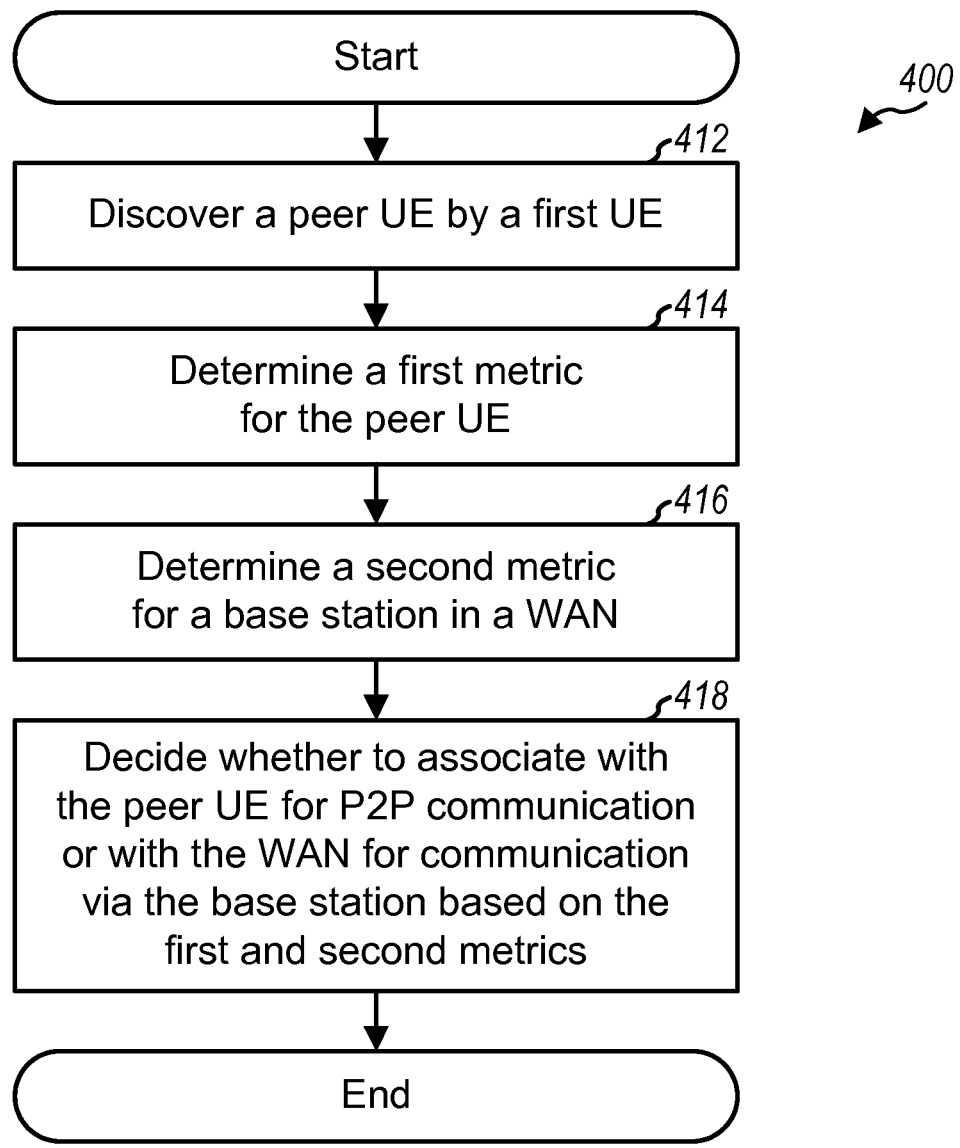

FIG. 4A shows a design of a process 400 for performing association. Process 400 may be performed by a first UE (as described below) or by some other entity (e.g., a base station). The first UE may discover a peer UE, e.g., through a peer discovery process (e.g., 412). The first UE may determine a first metric for the peer UE (block 414) and may also determine a second metric for a base station in a WAN (block 416). The base station may be a macro base station, or a femto base station, or a pico base station, or a relay station, etc. The first UE may decide whether to associate with the peer UE for P2P communication or with the WAN for communication via the base station based on the first and second metrics (block 418).

Figure 4B:
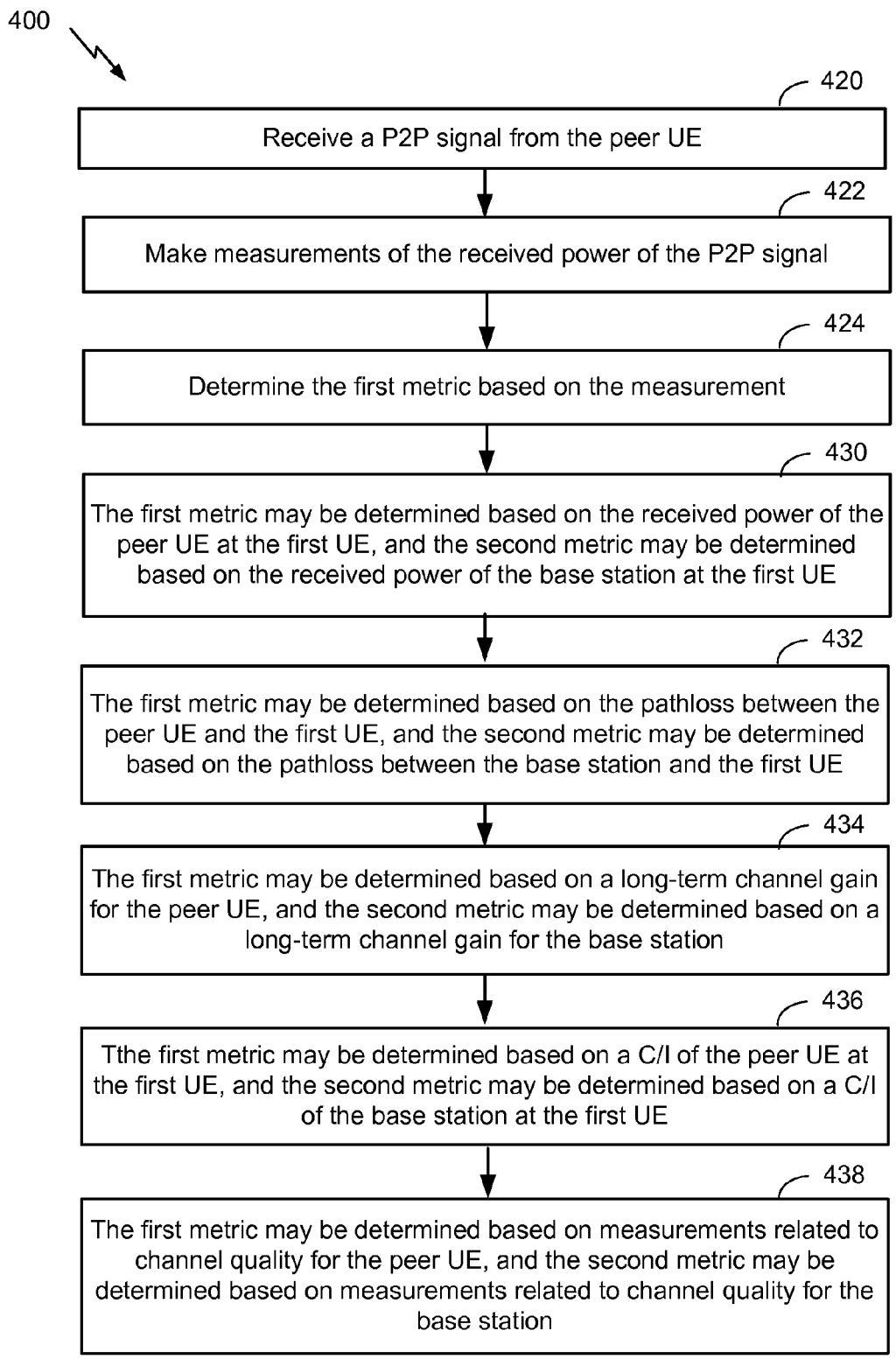
Figure 4C:
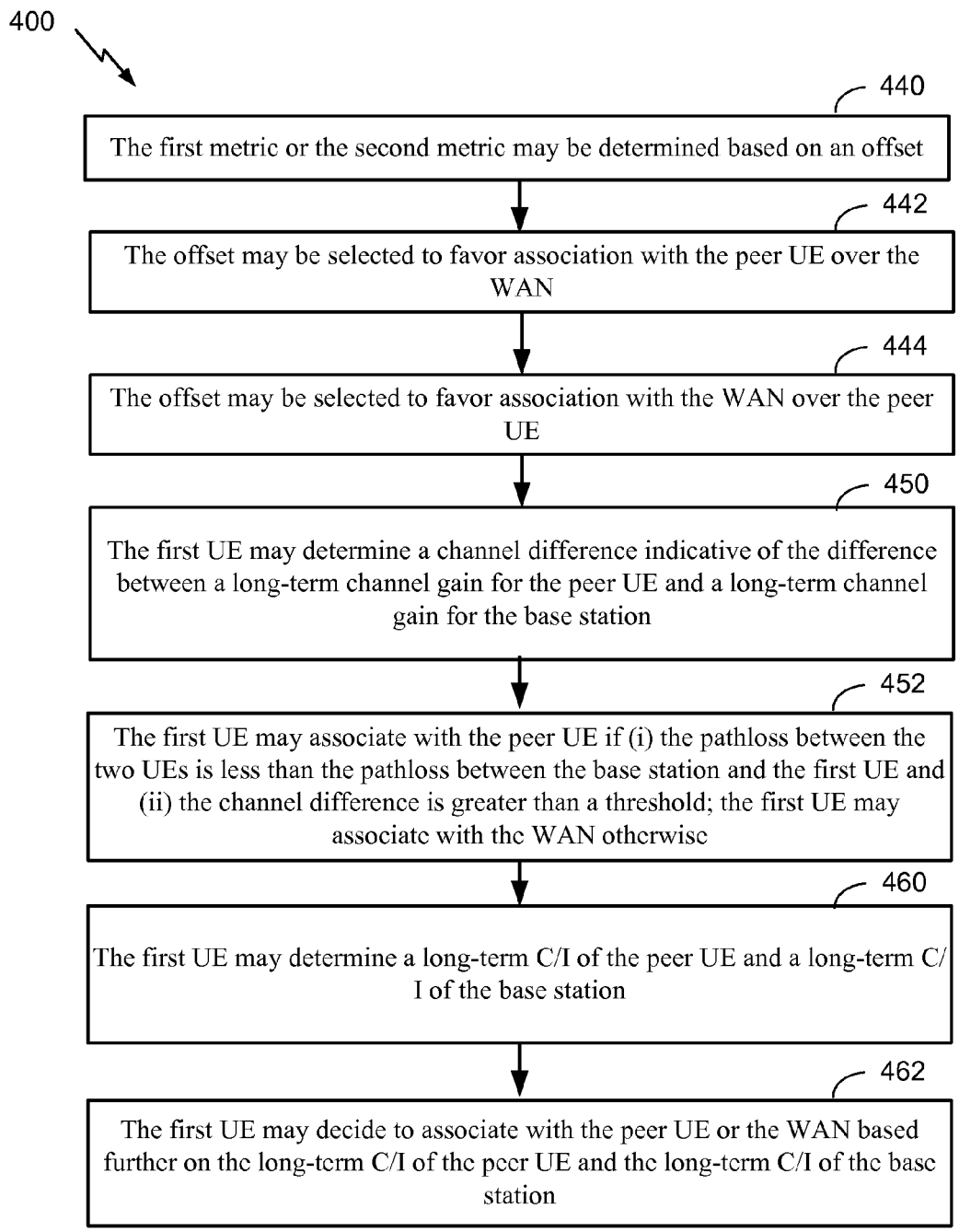

With reference to FIGS. 4B-C, there are shown further operations or aspects of the method 400 that are optional and may be performed by a UE or the like. If the method 400 includes at least one block of FIGS. 4B-C, then the method 400 may terminate after the at least one block, without necessarily having to include any subsequent downstream block(s) that may be illustrated. It is further noted that numbers of the blocks do not imply a particular order in which the blocks may be performed according to the method 400. For example, with reference to FIG. 4B, in one design of block 414, the first UE may receive a P2P signal from the peer UE (block 420), make measurements of the received power of the P2P signal (block 422), and determine the first metric based on the measurement (block 424). The first UE may determine the second metric for the base station in a similar manner in block 416.

In one design of blocks 414 and 416, the first metric may be determined based on the received power of the peer UE at the first UE, and the second metric may be determined based on the received power of the base station at the first UE (block 430). In another design, the first metric may be determined based on the pathloss between the peer UE and the first UE, and the second metric may be determined based on the pathloss between the base station and the first UE (block 432). In yet another design, the first metric may be determined based on a long-term channel gain for the peer UE, and the second metric may be determined based on a long-term channel gain for the base station (block 434). In yet another design, the first metric may be determined based on a C/I of the peer UE at the first UE, and the second metric may be determined based on a C/I of the base station at the first UE (block 436). In general, the first metric may be determined based on measurements related to channel quality for the peer UE, and the second metric may be determined based on measurements related to channel quality for the base station (block 438).

With reference to FIG. 4C, in one design, the first metric or the second metric may be determined based on an offset (block 440). The offset may be selected to favor association with the peer UE over the WAN (block 442). Alternatively, the offset may be selected to favor association with the WAN over the peer UE (block 444). The offset may be configured for the first UE, or broadcast by the base station or WAN, or specified (e.g., in a standard), or obtained in other manners. In general, the first UE may receive a parameter from the WAN and may determine the first metric and/or the second metric based on the parameter.

In one design, the first UE may determine a channel difference indicative of the difference between a long-term channel gain for the peer UE and a long-term channel gain for the base station (block 450). The first UE may decide whether to associate with the peer UE or the WAN based further on the channel difference. For example, the first and second metrics may relate to pathloss. The first UE may associate with the peer UE if (i) the pathloss between the two UEs is less than the pathloss between the base station and the first UE and (ii) the channel difference is greater than a threshold. The first UE may associate with the WAN otherwise (block 452).

In another design, the first UE may determine a long-term C/I of the peer UE and a long-term C/I of the base station (block 460). The first UE may decide to associate with the peer UE or the WAN based further on the long-term C/I of the peer UE and the long-term C/I of the base station (block 462). In general, any number of metrics may be determined based on any number of criteria for each of the peer UE and the base station and may be used to make association decision.

Figure 6:
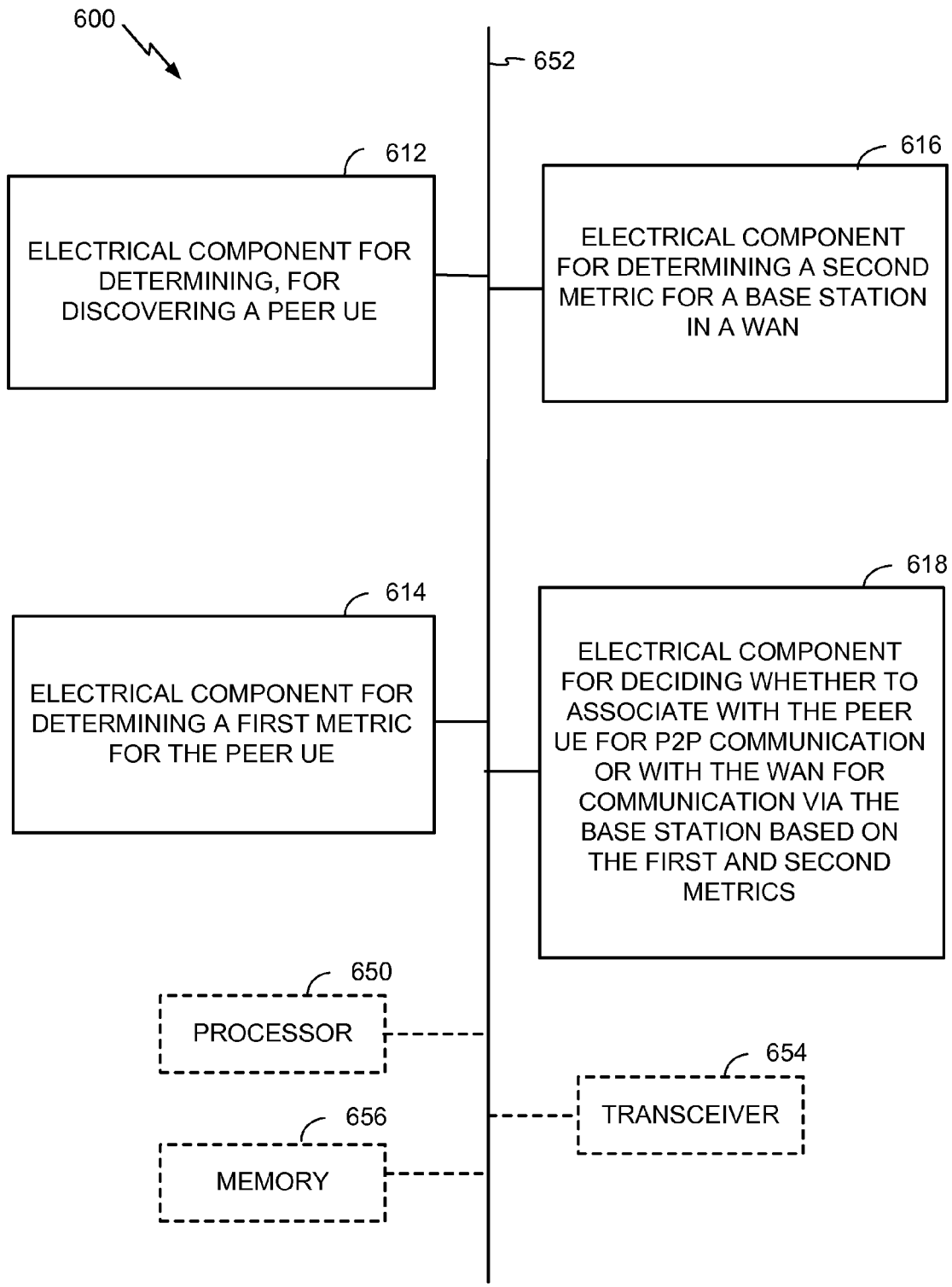

In accordance with one or more aspects of the embodiments described herein, there are provided devices and apparatuses for distributed DFS, as described above with reference to FIGS. 4A-C. With reference to FIG. 6, there is provided an exemplary apparatus 600 that may be configured as a mobile entity (e.g., UE or the like), or as a processor or similar device/component for use within. The apparatus 600 may include functional blocks that can represent functions implemented by a processor, software, or combination thereof (e.g., firmware). For example, apparatus 600 may include an electrical component or module 612 for discovering a peer UE. The apparatus 600 may include a component 614 for determining a first metric for the peer UE. The apparatus 600 may include a component 616 for determining a second metric for a base station in a WAN. The apparatus 600 may include a component 618 for deciding whether to associate with the peer UE for P2P communication or with the WAN for communication via the base station based on the first and second metrics.

In related aspects, the apparatus 600 may optionally include a processor component 650 having at least one processor, in the case of the apparatus 600 configured as a mobile entity (e.g., UE), rather than as a processor. The processor 650, in such case, may be in operative communication with the components 612-618 via a bus 652 or similar communication coupling. The processor 650 may effect initiation and scheduling of the processes or functions performed by electrical components 612-618.

Figure 5:
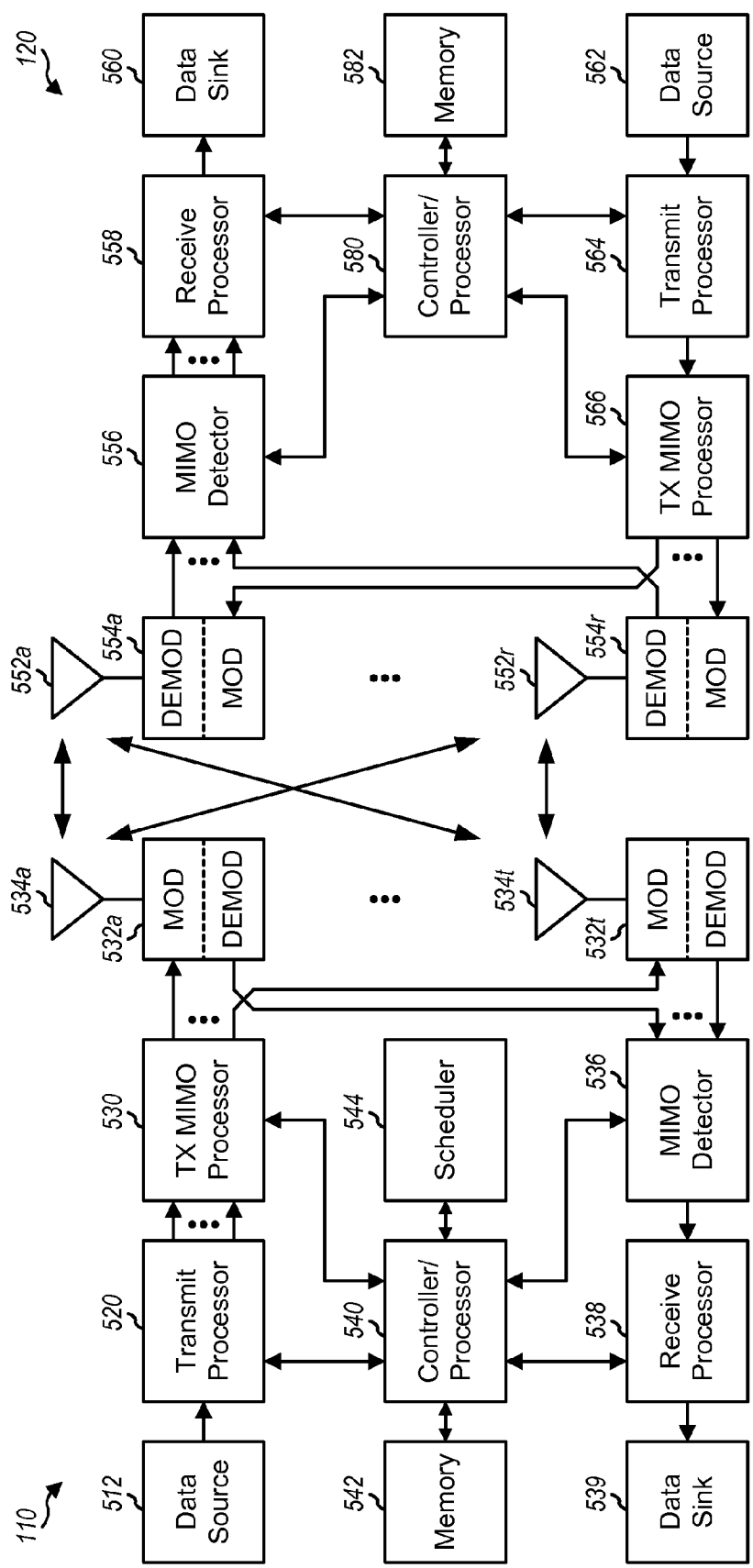

In further related aspects, the apparatus 600 may include a radio transceiver component 654. A stand alone receiver and/or stand alone transmitter may be used in lieu of or in conjunction with the transceiver 654. The apparatus 600 may optionally include a component for storing information, such as, for example, a memory device/component 656. The computer readable medium or the memory component 656 may be operatively coupled to the other components of the apparatus 600 via the bus 652 or the like. The memory component 656 may be adapted to store computer readable instructions and data for effecting the processes and behavior of the components 612-618, and subcomponents thereof, or the processor 650, or the methods disclosed herein. The memory component 656 may retain instructions for executing functions associated with the components 612-618. While shown as being external to the memory 656, it is to be understood that the components 612-618 can exist within the memory 656. It is further noted that the components in FIG. 6 may comprise processors, electronic devices, hardware devices, electronic sub-components, logical circuits, memories, software codes, firmware codes, etc., or any combination thereof FIG. 5 shows a block diagram of a design of a base station/eNB 110 and a UE 120, which may be one of the base stations/eNBs and one of the UEs in FIG. 1. Base station 110 may be equipped with T antennas 534a through 534t, and UE 120 may be equipped with R antennas 552a through 552r, where in general T≥1 and R≥1.

At base station 110, a transmit processor 520 may receive data for one or more UEs from a data source 512 and control information from a controller/processor 540. Processor 520 may process (e.g., encode and modulate) the data and control information to obtain data symbols and control symbols, respectively. A transmit (TX) multiple-input multiple-output (MIMO) processor 530 may perform spatial processing (e.g., precoding) on the data symbols, the control symbols, and/or reference symbols, if applicable, and may provide T output symbol streams to T modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At UE 120, antennas 552a through 552r may receive the downlink signals from base station 110 and other base stations, receive P2P signals from other UEs, and provide received signals to demodulators (DEMODs) 554a through 554r, respectively. Each demodulator 554 may condition (e.g., filter, amplify, downconvert, and digitize) its received signal to obtain input samples. Each demodulator 554 may further process the input samples (e.g., for OFDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate and decode) the detected symbols, provide decoded data for UE 120 to a data sink 560, and provide decoded control information to a controller/ processor 580.

On the uplink, at UE 120, a transmit processor 564 may receive and process data from a data source 562 and control information from controller/processor 580. Transmit processor 564 may also generate symbols for P2P communication (e.g., symbols for a peer detection signal and a P2P signal). The symbols from transmit processor 564 may be precoded by a TX MIMO processor 566 if applicable, further processed by modulators 554a through 554r (e.g., for SC-FDM, OFDM, etc.), and transmitted to base station 110, other base stations, and/or other UEs. At base station 110, the uplink signals from UE 120 and other UEs may be received by antennas 534, processed by demodulators 532, detected by a MIMO detector 536 if applicable, and further processed by a receive processor 538 to obtain decoded data and control information sent by UE 120 and other UEs. Processor 538 may provide the decoded data to a data sink 539 and the decoded control information to controller/processor 540.

Controllers/processors 540 and 580 may direct the operation at base station 110 and UE 120, respectively. Processor 580 and/or other processors and modules at UE 120 may perform the processing for UE 120x in FIG. 2. Processor 580 and/or other processors and modules at UE 120 may also implement various modules in FIG. 3. Processor 580 and/or other processors and modules at UE 120 may also perform or direct process 400 in FIGS. 4A-C and/or other processes for the techniques described herein. Memories 542 and 582 may store data and program codes for base station 110 and UE 120, respectively. A scheduler 544 may schedule UEs for data transmission on the downlink and/or uplink.

In one configuration, apparatus 120 for wireless communication may include means for discovering a peer UE by a first UE, means for determining a first metric for the peer UE, means for determining a second metric for a base station in a WAN, and means for deciding whether to associate with the peer UE for P2P communication or with the WAN for communication via the base station based on the first and second metrics.

In an aspect, the aforementioned means may be processors 580 and/or other processors at UE 120, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a first user equipment (UE) for wireless communication, comprising:
   discovering a peer UE;
   determining a first metric for peer-to-peer (P2P) communication with the peer UE;
   determining a second metric for communicating with a base station in a wide area cellular network;
   applying different offsets to the first and second metrics to generate an adjusted first metric and an adjusted second metric, wherein the different offsets create an association bias to either the peer UE or the wide area cellular network; and
   deciding whether to associate with the peer UE for the P2P communication or with the wide area cellular network for communication via the base station, based on the adjusted first and second metrics.

2. The method of claim 1, wherein the determining the first metric for the peer UE comprises:
   receiving a P2P signal from the peer UE;
   making measurements of received power of the received P2P signal; and
   determining the first metric based on the measurements.

3. The method of claim 1, wherein the determining the first metric comprises determining the first metric based on received power of the peer UE at the first UE, and wherein the determining the second metric comprises determining the second metric based on received power of the base station at the first UE.

4. The method of claim 1, wherein the determining the first metric comprises determining the first metric based on pathloss between the peer UE and the first UE, and wherein the determining the second metric comprises determining the second metric based on pathloss between the base station and the first UE.

5. The method of claim 1, wherein the determining the first metric comprises determining the first metric based on a long-term channel gain for the peer UE, and wherein the determining the second metric comprises determining the second metric based on a long-term channel gain for the base station.

6. The method of claim 1, wherein the determining the first metric comprises determining the first metric based on a carrier-to-interference ratio (C/I) of the peer UE at the first UE, and wherein the determining the second metric comprises determining the second metric based on a C/I of the base station at the first UE.

7. The method of claim 1, wherein the determining the first metric comprises determining the first metric based on measurements related to channel quality for the peer UE, and wherein the determining the second metric comprises determining the second metric based on measurements related to channel quality for the base station.

8. The method of claim 1, wherein the first metric or the second metric is determined based on an offset selected to favor association with the peer UE over the wide area cellular network.

9. The method of claim 1, wherein the first metric or the second metric is determined based on an offset selected to favor association with the wide area cellular network over the peer UE.

10. The method of claim 1, further comprising:
receiving a parameter from the wide area cellular network; and
determining the first metric, or the second metric, or both based on the parameter received from the wide area cellular network.

11. The method of claim 1, further comprising determining a channel difference indicative of a difference between a long-term channel gain for the peer UE and a long-term channel gain for the base station, wherein whether to associate with the peer UE or the wide area cellular network is decided based further on the channel difference.

12. The method of claim 11, wherein the first metric relates to pathloss between the peer UE and the first UE, wherein the second metric relates to pathloss between the base station and the first UE, and wherein the deciding whether to associate with the peer UE or the wide area cellular network comprises:
associating with the peer UE if the pathloss between the peer UE and the first UE is less than the pathloss between the base station and the first UE and further if the channel difference is greater than a threshold; and
associating with the wide area cellular network if association with the peer UE is not selected.

13. The method of claim 1, further comprising:
determining a long-term carrier-to-interference ratio (C/I) of the peer UE;
determining a long-term C/I of the base station; and
deciding whether to associate with the peer UE or the wide area cellular network based further on the long-term C/I of the peer UE and the long-term C/I of the base station.

14. The method of claim 1, wherein the base station comprises a macro base station.

15. The method of claim 1, wherein the base station comprises one of a femto base station, a pico base station, and a relay station.

16. An apparatus for wireless communication, comprising:
at least one processor configured to:
discover a peer user equipment (UE) by a first UE;
determine a first metric for peer-to-peer (P2P) communication with the peer UE;
determine a second metric for communicating with a base station in a wide area cellular network;
apply different offsets to the first and second metrics to generate an adjusted first metric and an adjusted second metric, wherein the different offsets create an association bias to either the peer UE or the wide area cellular network; and
decide whether to associate with the peer UE for the P2P communication or with the wide area cellular network for communication via the base station, based on the adjusted first and second metrics; and
a memory coupled to the at least one processor for storing data.

17. The apparatus of claim 16, wherein the at least one processor determines the first metric for the peer UE by:
receiving a P2P signal from the peer UE;
making measurements of received power of the received P2P signal; and
determining the first metric based on the measurements.

18. The apparatus of claim 16, wherein the at least one processor determines the first metric based on received power of the peer UE at the first UE, and wherein the at least one processor determines the second metric based on received power of the base station at the first UE.

19. An apparatus for wireless communication, comprising:
means for discovering a peer user equipment (UE) by a first UE;
means for determining a first metric for peer-to-peer (P2P) communication with the peer UE;
means for determining a second metric for communicating with a base station in a wide area cellular network;
means for applying different offsets to the first and second metrics to generate an adjusted first metric and an adjusted second metric, wherein the different offsets create an association bias to either the peer UE or the wide area cellular network; and
means for deciding whether to associate with the peer UE for the P2P communication or with the wide area cellular network for communication via the base station, based on the adjusted first and second metrics.

20. A non-transitory computer-readable medium comprising code for causing a computer to:
discover a peer user equipment (UE) by a first UE;
determine a first metric for peer-to-peer (P2P) communication with the peer UE;
determine a second metric for communicating with a base station in a wide area cellular network;
apply different offsets to the first and second metrics to generate an adjusted first metric and an adjusted second metric, wherein the different offsets create an association bias to either the peer UE or the wide area cellular network; and
decide whether to associate with the peer UE for the P2P communication or with the wide area cellular network for communication via the base station, based on the adjusted first and second metrics.

* * * * *